US012673773B2

(12) United States Patent
Hale et al.

(10) Patent No.: US 12,673,773 B2
(45) Date of Patent: Jul. 7, 2026

(54) BEZEL ASSEMBLY WITH DEPLOYABLE FRICTION HINGED SHELF

(71) Applicant: B/E Aerospace, Inc., Winston-Salem, NC (US)

(72) Inventors: Isaac Hale, Winston Salem, NC (US); Travis Finlay, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 174 days.

(21) Appl. No.: 18/653,432

(22) Filed: May 2, 2024

(65) Prior Publication Data

US 2025/0340299 A1 Nov. 6, 2025

(51) Int. Cl.
B64D 11/06 (2006.01)

(52) U.S. Cl.
CPC .................................. B64D 11/0638 (2014.12)

(58) Field of Classification Search
CPC ... B60N 3/004; B64D 11/0638; E05D 11/082; E05D 11/084
USPC ............ 16/342; 211/95, 129.1, 130.1, 131.1, 211/131.2
See application file for complete search history.

(56) References Cited

U.S. PATENT DOCUMENTS

| | | | |
|---|---|---|---|
| 4,261,582 A | 4/1981 | Womack | |
| 5,123,662 A | 6/1992 | Sugimura | |
| 6,125,509 A | 10/2000 | Hartigan et al. | |
| 6,249,426 B1 * | 6/2001 | O'Neal | G06F 1/1616 16/334 |
| 6,297,946 B2 * | 10/2001 | O'Neal | G06F 1/1616 16/334 |
| 6,304,433 B2 * | 10/2001 | O'Neal | G06F 1/1616 16/334 |
| 7,679,892 B2 * | 3/2010 | Jung | F16M 11/10 361/679.21 |
| 8,474,917 B2 * | 7/2013 | Line | B60N 2/6009 297/188.05 |
| 10,538,333 B1 * | 1/2020 | Pinger | B64D 11/0627 |
| 10,703,482 B1 * | 7/2020 | Puglisi | B64D 11/0638 |
| 11,952,125 B2 * | 4/2024 | Lopez | B64D 11/0638 |
| 2007/0050944 A1 * | 3/2007 | Chiu | E05D 11/082 16/342 |
| 2012/0192380 A1 * | 8/2012 | Huang | D06F 39/14 16/319 |
| 2019/0368610 A1 | 12/2019 | Mochiduki et al. | |
| 2023/0312106 A1 | 10/2023 | Ponjican et al. | |

* cited by examiner

*Primary Examiner* — Arfan Y. Sinaki
(74) *Attorney, Agent, or Firm* — Suiter Swantz IP

(57) ABSTRACT

A bezel assembly for mounting onto a back of a seat includes a bezel having an outer peripheral portion and an inner recess, and a deployable shelf rotatably mounted to the bezel and configured to rotate between stowed and deployed positions. The rotational attachments are friction hinges including a bracket and a dowel pin receivable in the shelf. One end of the dowel pin defines a plurality of circumferential grooves for seating one or more O-rings for providing a variable frictional interface for constraining rotation of the deployable shelf. In embodiments, the friction hinges eliminate the need for a separate mechanical latch for holding the deployable shelf in a stowed position.

19 Claims, 8 Drawing Sheets

BEZEL ASSEMBLY WITH DEPLOYABLE FRICTION HINGED SHELF

TECHNICAL FIELD AND BACKGROUND

The present disclosure relates generally to a bezel assembly for mounting onto a back of a passenger seat, and more particularly, to a bezel assembly including a deployable shelf that is rotatably mounted to a bezel using tunable friction hinges for constraining rotation and to eliminate the need for a separate latch.

The back of passenger seats in aircraft cabins and the like provide a mounting surface for amenities for use by other passengers. For example, deployable tray tables, video monitors, portable electronic device (PED) holders, and literature pockets may all be mounted onto a back of a passenger seat for use by a passenger in the next row.

Tray tables, video monitors, and PED holders may all be rotatably mounted to the back of the passenger seat such that these devices can be rotated between a stowed position in preparation for taxi, takeoff, and landing (TTOL), and a deployed position for use during flight. Traditional rotational attachments include frictionless hinges that do not constrain rotational motion. Some rotational attachments, for instance for PED holders, may incorporate a torsion spring in the hinge to provide return assistance for stowing the PED holder. At least tray tables and PED holders require a separate mechanical latch for maintaining these devices in their respective stowed positions against the back of the seat. Separate mechanical latches add complexity and cost to the seat, and in some cases further introduce a head strike danger that contributes to a lesser head impact criteria (HIC) score.

Therefore, what is needed is a solution for rotationally constraining back of seat mounted devices that eliminates the need for a separate mechanical latch.

BRIEF SUMMARY

According to one aspect, the inventive concepts according to the present disclosure are directed to a bezel assembly for mounting onto a back of a passenger seat. In embodiments, the bezel assembly includes a bezel including an outer peripheral portion and an inner recess, the inner recess having an upper portion for receiving a video monitor and a lower portion positioned below the upper portion. The assembly further includes a deployable shelf positioned in the lower portion, the deployable shelf configured to rotate between a stowed position in the inner recess and a deployed position outside of the inner recess. Left and right side friction hinges rotatably mount the respective left and right sides of the deployable shelf to the bezel. In embodiments, each friction hinge includes a bracket mounted to the bezel including a cylindrical receiver opening in a direction of the deployable shelf, and a dowel pin having a first end rotatably mounted in the cylindrical receiver and a second end mounted in the deployable shelf. The first end of the dowel pin defines a plurality of circumferential grooves. At least one O-ring is mounted in at least one of the circumferential grooves to provide a frictional interface between the first end of the dowel pin and the cylindrical receiver. In use, the number, type, and positions of the O-rings may be tuned to provide a desired amount of frictional resistance to rotation, and to maintain the deployable shelf in the stowed position without the need for a separate mechanical latch.

In some embodiments, the assembly further includes at least two O-rings mounted in at least two different ones of the plurality of circumferential grooves.

In some embodiments, the frictional force of the at least one O-ring is sufficient to maintain the deployable shelf in the stowed position.

In some embodiments, the dowel pin includes a circumferential shoulder demarcating the first and second ends, wherein one end of the circumferential shoulder bears against the end of the cylindrical receiver.

In some embodiments, a longitudinal length of the first end of the dowel pin substantially equal to a longitudinal length of the cylindrical receiver.

In some embodiments, the plurality of circumferential grooves are spaced apart and parallel.

In some embodiments, the deployable shelf forms a plurality of upstanding parallel ribs for positioning a device positioned on the deployable shelf.

In some embodiments, a free edge of the deployable shelf, when in the stowed position, is spaced apart from the bezel to facilitate grabbing the free edge to deploy the deployable shelf.

In some embodiments, the deployable shelf includes a first portion and a second portion angled relative to the first portion.

According to another aspect, the inventive concepts according to the present disclosure are directed to friction hinge for rotatably mounting a deployable shelf to a bezel mountable onto a back of a passenger seat. In embodiments, the friction hinge includes a bracket configured to be mounted to the bezel, the bracket including a plate at one end and a cylindrical receiver at an opposing end. The friction hinge further includes a dowel pin having a first end rotatably mounted in the cylindrical receiver, and a second end configured to be mounted in deployable shelf, wherein the first end of the dowel pin defines a plurality of circumferential grooves. The friction hinge further includes at least one O-ring mounted in at least one of the circumferential grooves, the at least one O-ring configured to provide a frictional interface between the first end of the dowel pin and the cylindrical receiver for maintaining a rotational position of the dowel pin relative to the cylindrical receiver.

According to a further aspect, the inventive concepts according to the present disclosure are directed to a deployable shelf assembly attachable to a bezel mounted onto a back of a passenger seat. In embodiments, the deployable shelf assembly includes a deployable shelf positionable in a recess formed in the bezel, and left and right side friction hinges for rotatably mounting the respective left and right sides of the deployable shelf to the bezel. In embodiments, each friction hinge includes a bracket mountable to the bezel and including a cylindrical receiver opening in a direction of the deployable shelf, and a dowel pin having a first end rotatably mounted in the cylindrical receiver and a second end mounted in the deployable shelf. The first end of the dowel pin defines a plurality of circumferential grooves, and at least one O-ring is mounted in at least one of the circumferential grooves to provide a frictional interface between the first end of the dowel pin and the cylindrical receiver for maintaining a rotational position of the dowel pin and consequently a position of the deployable shelf, for instance a fully stowed position of the deployable shelf.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
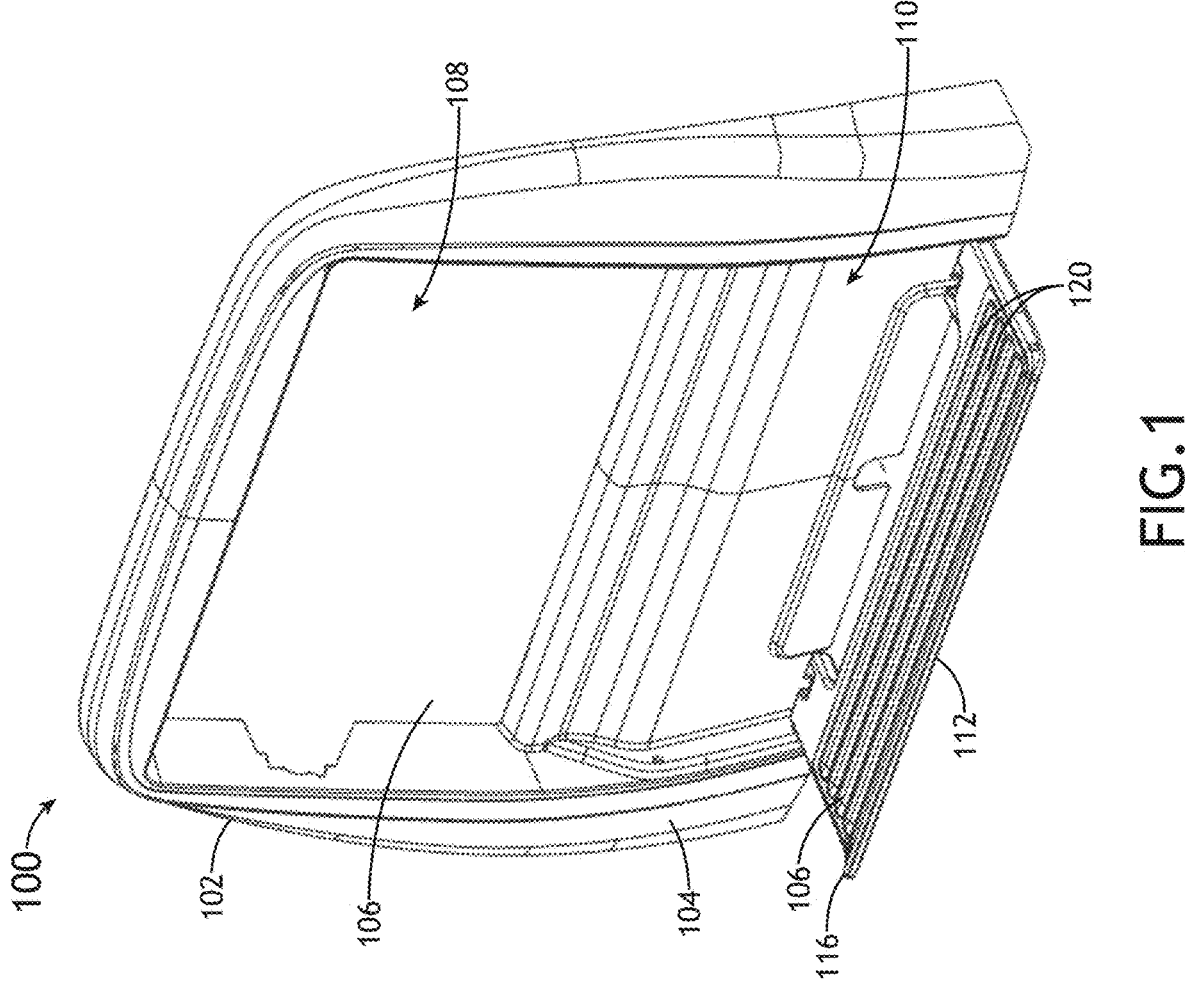
FIG. 1 is an isometric view of a bezel assembly including a deployable shelf shown in a deployed position, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to components and assemblies configured to be mounted on the back of a passenger seat. The term "shelf" as used herein may mean a support surface for use in conjunction with portable electronic devices, food, and beverages, etc. Thus, the term "shelf" generically refers to any support surface. In use, the shelf is configured to rotate between a stowed position in preparation for TTOL and a deployed position for use during flight. In some embodiments, the shelf may stow flush against the back of the passenger seat in a substantially upright orientation, and deploy to a horizontal or substantially horizontal orientation.

In embodiments, the shelf is rotatably mounted to a component mounted onto or mountable onto the back of the passenger seat, and is mounted on each of its respective left and right sides (i.e., first and second sides) in a symmetrical configuration to provide stable support, smooth rotation, and to maintain squareness. In embodiments, the rotational attachments are accomplished using friction hinges, for instance provided in a symmetrical arrangement on each of the left and right sides. In preferred embodiments, the majority of the friction hinge components are concealed within a bezel or within the shelf to protect the friction hinges, avoid pinch points, and to enhance the aesthetics of the back of the seat. The friction hinges provide a better feel and finish, are cost-effective, have a low-profile, have no spring-back, and eliminate the need for a separate mechanical latch, among other benefits and advantages. In addition, the inclusion of multiple circumferential grooves makes possible the ability to position one or more O-rings to create variable amounts of friction without having to create a new hinge.

Figure 2:
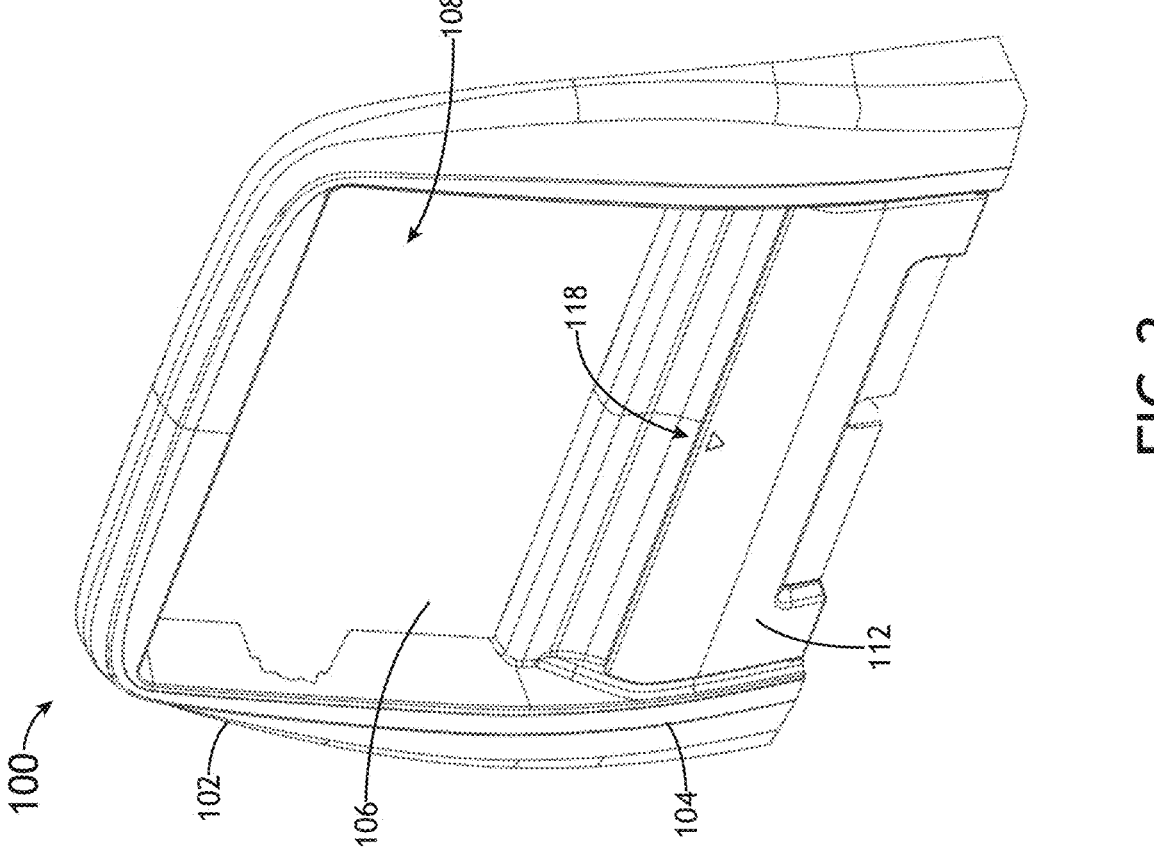
FIG. 2 is an isometric view of the bezel assembly showing the deployable shelf in a stowed position, in accordance with example embodiments of this disclosure.

FIGS. 1 and 2 illustrate a bezel assembly 100 for mounting onto a back of a passenger seat, for instance an upper portion of a back of a passenger seat. The bezel assembly 100 generally includes a bezel 102 having an outer peripheral portion 104 and an inner recess 106. The inner recess 106 has an upper portion 108 for receiving a video monitor, and a lower portion 110 positioned below the upper portion 108. In embodiments, the bezel 102 including its respective portions is integrally formed, for instance molded.

The bezel assembly 100 further includes a deployable shelf 112, hereafter simply the "shelf." As shown, the shelf 112 is positioned in the lower portion 110 of the inner recess 106, and is configured to rotate between a stowed position as shown in FIG. 2, and a deployed position as shown in FIG. 1. In embodiments, the shelf 112 may also be rotated to one or more intermediate positions. When fully stowed, the shelf 112 may be positioned upright, within the confines of the inner recess 106, and substantially flush against the bezel 102. When fully deployed, the shelf 112 may be positioned outside of the inner recess 106, and may be oriented horizontally or substantially horizontally.

In some embodiments, the shelf 112 includes a first portion 114 and a second portion 116 angled relative to the first portion 114. The angling of the second portion 116 creates an upwardly sloped 'front' edge when the shelf 112 is deployed to help maintain objects (e.g., PED) placed on the shelf 112, and further angles the 'top' of the stowed shelf 112 away from the passenger for safety. In embodiments, the 'top' of the shelf 112 when fully stowed is spaced apart from the bezel 102 to create a gap 118 for grabbing the shelf 112 to rotate the shelf 112. In embodiments, the 'top' face of the shelf 112 includes a plurality of formed upstanding and parallel ridges 120 for maintaining a position of an object (e.g., PED) placed on the shelf 112. The shape of the bezel 102 and the shelf 112 is primarily aesthetic and therefore is not critical and may vary. The bezel 102 may be mounted onto the back of the passenger seat by traditional mounting methods and hardware.

Figure 3:
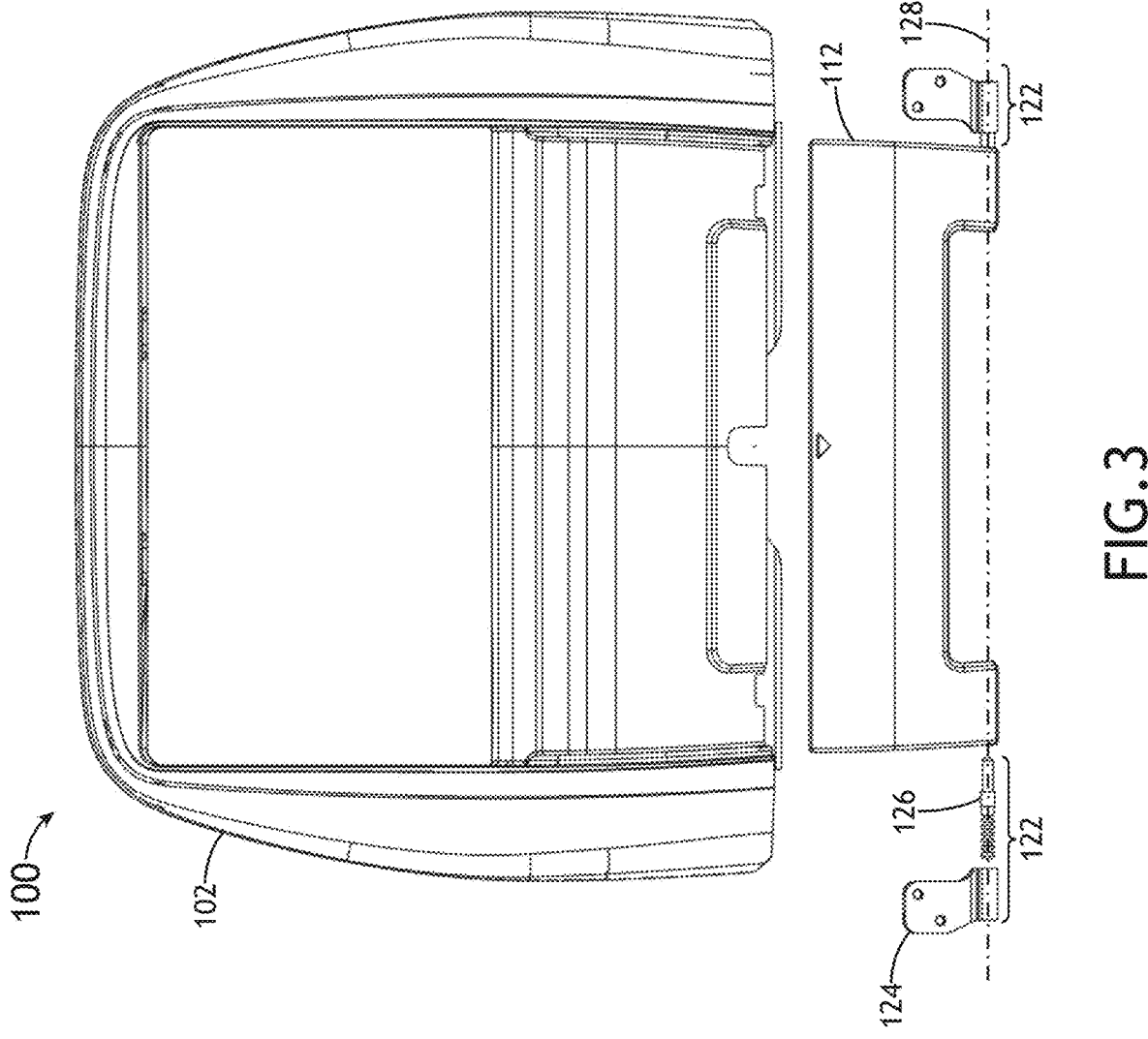
FIG. 3 is an exploded perspective view showing bezel, shelf, and friction hinge components of the bezel assembly, in accordance with example embodiments of this disclosure.

FIG. 3 is an exploded view of the bezel assembly 100 showing the various components and their positional relationships. The shelf 112 is rotatably attached to the bezel 102 using friction hinges 122. In embodiments, the friction hinges 122 are provided on the left and right sides of the shelf, in the perspective shown, in a symmetrical arrangement to stably and squarely support the rotational motion of the shelf 112. Each friction hinge 122 generally includes a bracket 124 configured to be mounted to the bezel 102, for instance concealed within the interior of the bezel 102, and a dowel pin 126 rotatably mountable in the bracket 124 and mountable in the shelf 112. The rotational axis of the shelf 112 is indicated at reference number 128.

Figure 4:
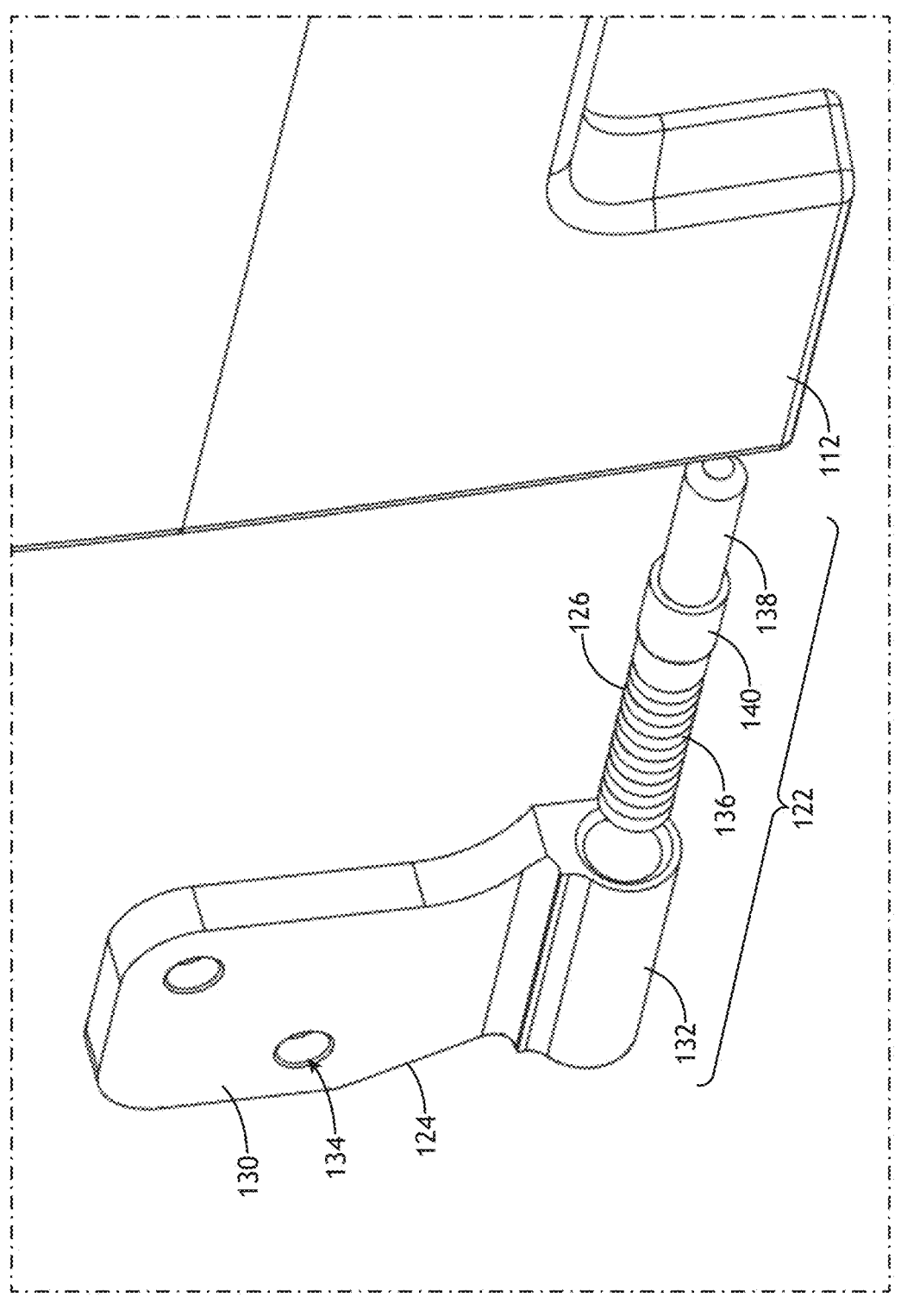
FIG. 4 is an exploded isometric view showing one of the friction hinges, in accordance with example embodiments of this disclosure.
Figure 5:
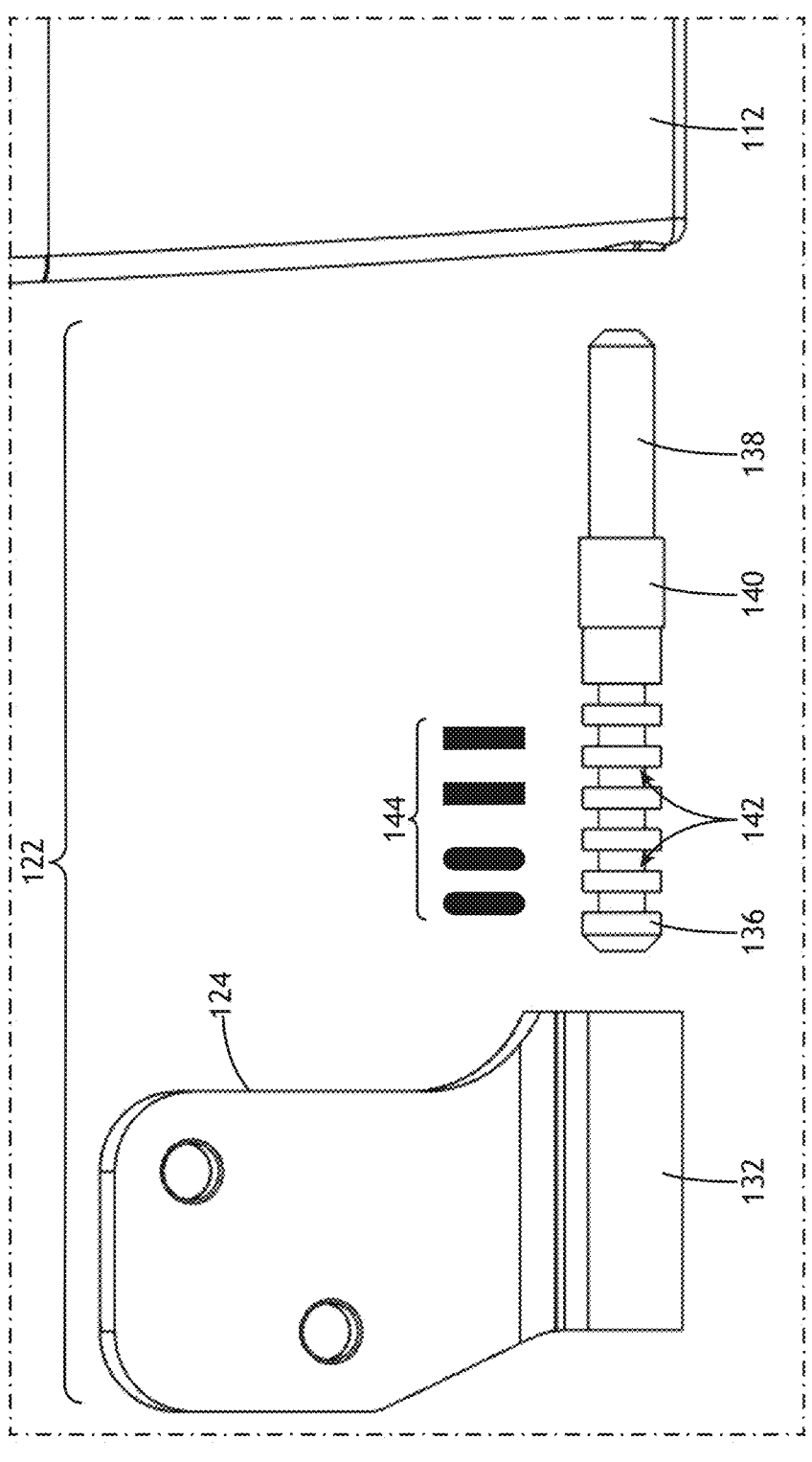
FIG. 5 is an exploded elevation view showing one of the friction hinges, in accordance with example embodiments of this disclosure.

FIGS. 4 and 5 illustrate specific features and aspects of the friction hinges 122. In embodiments, the bracket 124 is integrally formed and includes an upper plate 130 and a lower cylindrical receiver 132, wherein the upper and lower positions are in the context of the perspective shown. The plate 130 includes a plurality of through holes 134 for receiving traditional fasteners for fixedly mounting the plate to the bezel. The cylindrical receiver 132 opens in a direction of the shelf 112.

The dowel pin 126 has a first end 136 rotatably mounted in the cylindrical receiver 132, and a second end 138 mounted in the shelf 112, for instance fixedly mounted in the lateral side of the shelf 112. As shown, the dowel pin 126 further includes a circumferential shoulder 140 demarcating the first and second ends 136, 138. In some embodiments, one end of the circumferential shoulder 140 bears against the end face of the cylindrical receiver 132 to set the longitudinal position of the dowel pin 126 relative to the bracket 124. In some embodiments, the longitudinal length of the first end 136 is substantially equal to the longitudinal length of the cylindrical receiver 132.

As best shown in FIG. 5, the first end 136 of the dowel pin 126 defines a plurality of spaced apart and parallel circumferential grooves 142. Each circumferential groove 142 is provided to seat an O-ring 144. Each individual groove 142 may have a particular profile, such as square or rounded. In addition, each O-ring 144 may also have a particular profile, such as square or rounded. In that case, various combinations of similar and different groove and O-ring profiles can be mixed and matched to achieve a desired frictional interface between the dowel pin 126 and the cylindrical receiver 132 to tune the amount of force required to rotate the shelf 112. In addition, the number of O-rings used, as well as their relative positions may be varied to provide a particular frictional resistance. For example, depending on the O-ring material, compression, and tolerance between the outer circumferential surface of the dowel pin 126 and the inner circumferential surface of the cylindrical receiver 132, the number of O-rings and their relative positions may be adjusted to 'tune' the resistance to rotation. In a preferred embodiment, the rotational constraint is sufficient to maintain the fully stowed position of the shelf 112 to eliminate the need for a separate mechanical latch. As the O-rings wear over time and repeated cycling, the assembly can be disassembled and new O-rings installed quickly and easily to avoid downtime.

Figure 6:
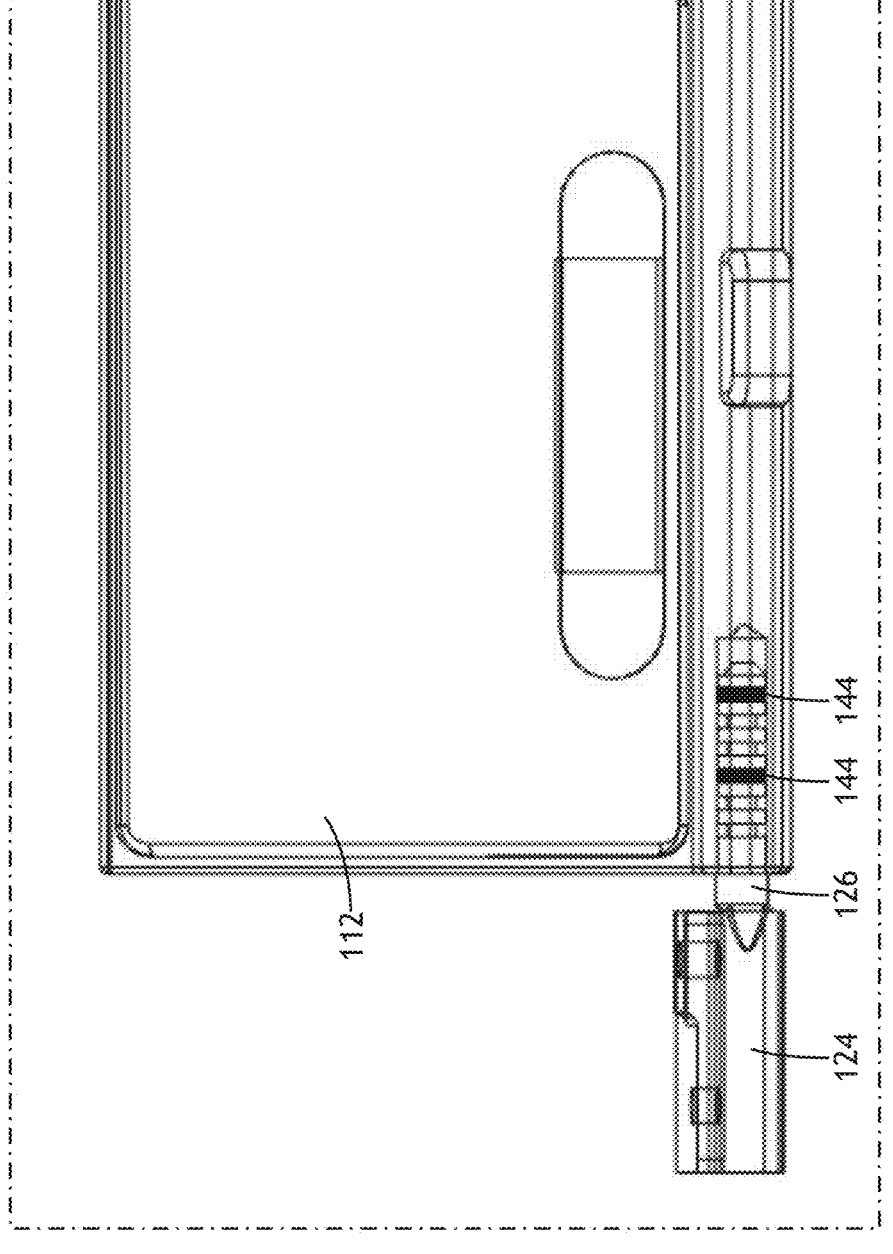
FIG. 6 is a front elevation view of a further embodiment of the bezel assembly in which the shelf, shown transparent, is rotatably mounted to the at least one friction hinge, in accordance with example embodiments of this disclosure.
Figure 7:
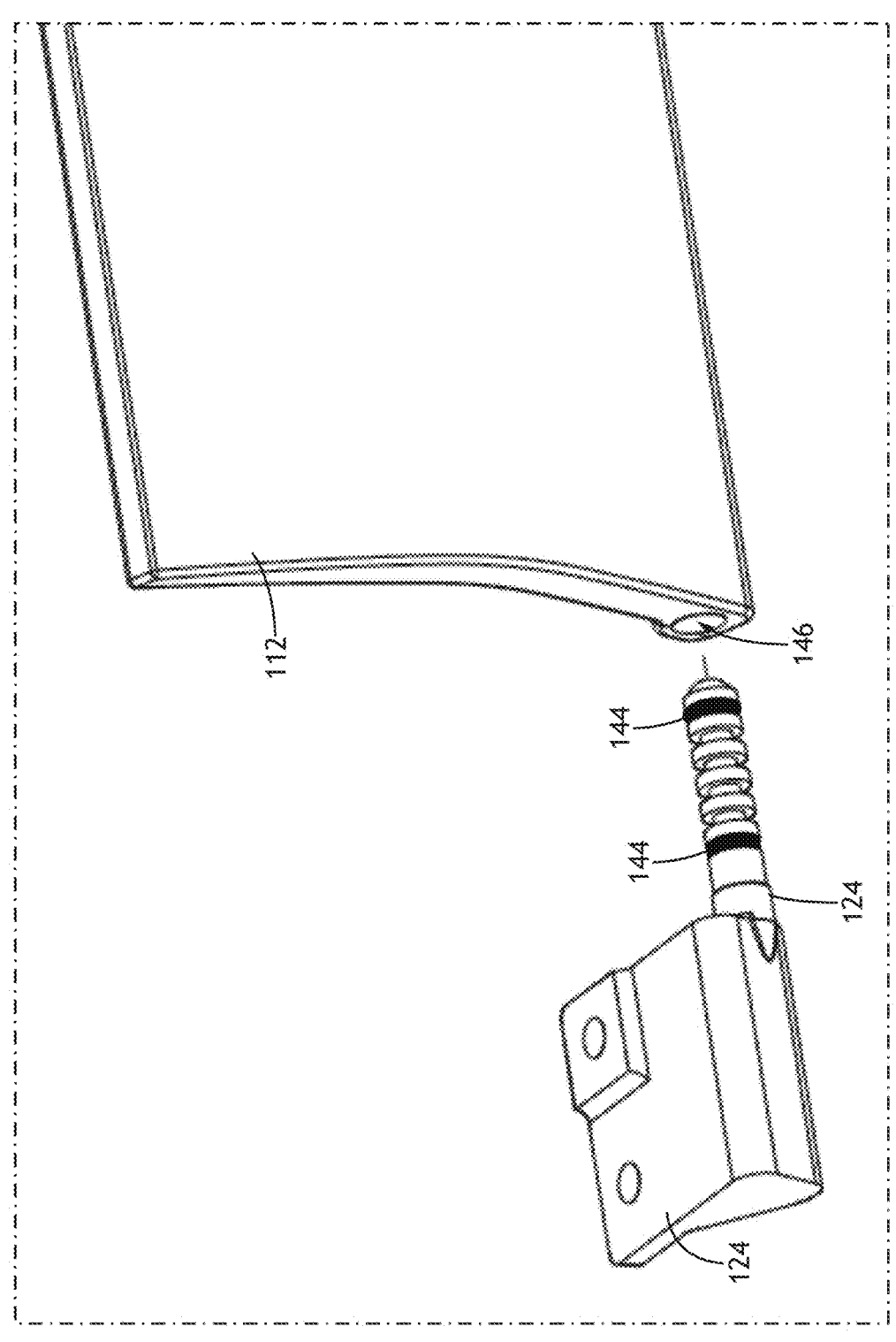
FIG. 7 is an isometric of the further embodiment of the bezel assembly showing the friction hinge removed from one end of the shelf, in accordance with example embodiments of this disclosure.
Figure 8:
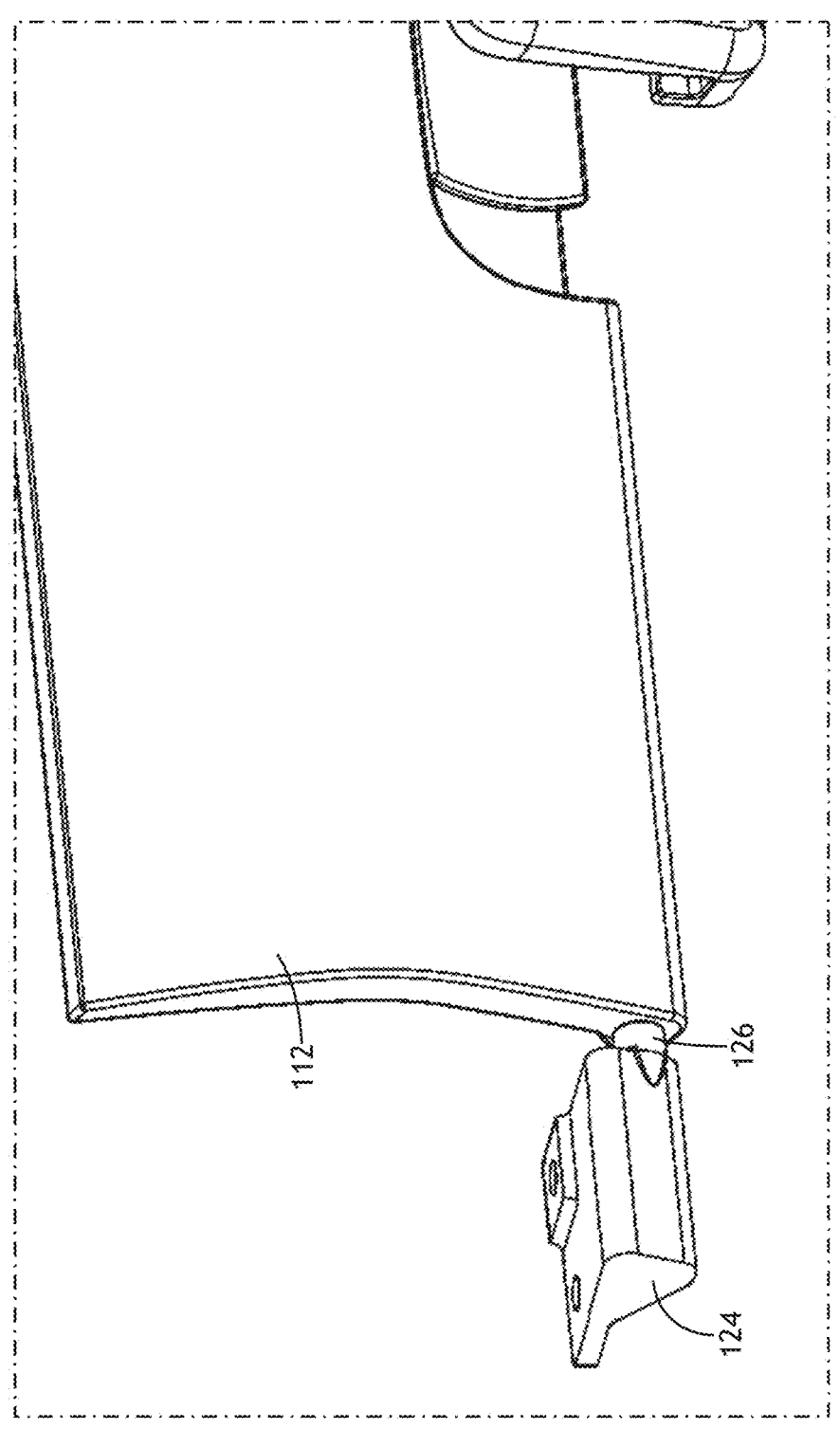
FIG. 8 is an isometric of the further embodiment of the bezel assembly showing the friction hinge installed in one end of the rotating shelf, in accordance with example embodiments of this disclosure.

FIGS. 6-8 show a further embodiment of the bezel assembly in which the shelf 112 is rotatably mounted on the dowel pin 126, and the dowel pin 126 in turn is mounted to or integrally formed with the bracket 124. In this configuration, the dowel pin 126 is rotationally fixed relative to the bracket 124 and the shelf 112 rotates relative to the end of the dowel pin 126 carrying the one or more O-rings 144. In embodiments, the friction hinges are provided in a symmetrical arrangement on the left and right sides or ends of the shelf 112 to frictionally constrain shelf rotation.

As shown in FIG. 7, the friction hinges may be installed first in their respective cylindrical opening 146 and then the brackets 124 mounted to the bezel to complete the installation. For repair or replacement, the brackets 124 may be detached from the bezel, removed from the shelf 112, and the O-rings 144 added, replaced, removed, repositioned, etc., depending on the desired frictional resistance. As shown in FIG. 8, the brackets 124 may mount horizontally, vertically, or otherwise depending on the mounting surface formed by the bezel. In this further embodiment, the rotational constraint is sufficient to maintain the fully stowed position of the shelf 112 to eliminate the need for a separate mechanical latch (latch shown is for the separately deployable tray table). As the O-rings wear over time from repeated cycling, the assembly can be disassembled and new O-rings installed quickly and easily to avoid downtime. In some embodiments, the shelf and the friction hinges may be provided as a line replaceable unit.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A bezel assembly for mounting onto a back of a passenger seat, the bezel assembly comprising:

a bezel including an outer peripheral portion and an inner recess, the inner recess having an upper portion for receiving a video monitor and a lower portion positioned below the upper portion;

a deployable shelf positioned in the lower portion, the deployable shelf configured to rotate between a stowed position in the inner recess and a deployed position outside of the inner recess;

left and right side friction hinges rotatably mounting the respective left and right sides of the deployable shelf to the bezel, each friction hinge including:

a bracket mounted to the bezel, the bracket including a cylindrical receiver opening in a direction of the deployable shelf;

a dowel pin having a first end rotatably mounted in the cylindrical receiver, and a second end mounted in the deployable shelf;

wherein the first end of the dowel pin defines a plurality of circumferential grooves; and at least one O-ring mounted in at least one of the plurality of circumferential grooves to provide a frictional interface between the first end of the dowel pin and the cylindrical receiver.

2. The bezel assembly according to claim 1, wherein the at least one O-ring comprises a first O-ring mounted in a first one of the plurality of circumferential grooves and a second O-ring mounted in a second one of the plurality of circumferential grooves.

3. The bezel assembly according to claim 1, wherein a frictional force provided by the at least one O-ring is configured to maintain the deployable shelf in the stowed position.

4. The bezel assembly according to claim 1, wherein the dowel pin includes a circumferential shoulder demarcating the first and second ends, and wherein one end of the circumferential shoulder bears against an end of the cylindrical receiver.

5. The bezel assembly according to claim 1, wherein a longitudinal length of the first end of the dowel pin is substantially equal to a longitudinal length of the cylindrical receiver.

6. The bezel assembly according to claim 1, wherein the plurality of circumferential grooves are spaced apart and parallel.

7. The bezel assembly according to claim 1, wherein the deployable shelf forms a plurality of upstanding parallel ribs for positioning a device positioned on the deployable shelf.

8. The bezel assembly according to claim 1, wherein a free edge of the deployable shelf, when in the stowed position, is spaced apart from the bezel to facilitate grabbing the free edge to deploy the deployable shelf.

9. The bezel assembly according to claim 1, wherein the deployable shelf includes a first portion and a second portion angled relative to the first portion.

10. A friction hinge for rotatably mounting a deployable shelf to a bezel mountable onto a back of a passenger seat, the friction hinge comprising:

a bracket configured to be mounted to the bezel, the bracket including a plate at one end and a cylindrical receiver at an opposing end;

a dowel pin having a first end rotatably mounted in the cylindrical receiver, and a second end configured to be mounted in the deployable shelf, wherein the first end of the dowel pin defines a plurality of circumferential grooves; and at least one O-ring mounted in at least one of the circumferential grooves, the at least one O-ring configured to provide a frictional interface between the first end of the dowel pin and the cylindrical receiver for maintaining a rotational position of the dowel pin relative to the cylindrical receiver.

11. The friction hinge according to claim 10, wherein the at least one O-ring comprises a first O-ring mounted in a first one of the plurality of circumferential grooves and a second O-ring mounted in a second one of the plurality of circumferential grooves.

12. The friction hinge according to claim 10, wherein the dowel pin includes a circumferential shoulder demarcating the first and second ends, and wherein one end of the circumferential shoulder bears against the end of the cylindrical receiver.

13. The friction hinge according to claim 10, wherein a longitudinal length of the first end of the dowel pin is substantially equal to a longitudinal length of the cylindrical receiver.

14. The friction hinge according to claim 10, wherein the plurality of circumferential grooves are spaced apart and parallel.

15. A deployable shelf assembly attachable to a bezel mounted onto a back of a passenger seat, the deployable shelf assembly comprising:

a deployable shelf positionable in a recess formed in the bezel;

left and right side friction hinges for rotatably mounting the respective left and right sides of the deployable shelf to the bezel, each friction hinge including:

a bracket mountable to the bezel; and a dowel pin having a first end mounted to the bracket, and a second end receivable in a respective opening formed in one side of the deployable shelf;

wherein the second end of the dowel pin defines a plurality of circumferential grooves; and at least one O-ring mounted in at least one of the circumferential grooves to provide a frictional interface between the second end of the dowel pin and the respective opening formed in the shelf for maintaining a position of the deployable shelf.

16. The deployable shelf assembly according to claim 15, wherein the at least one O-ring comprises a first O-ring mounted in a first one of the plurality of circumferential grooves and a second O-ring mounted in a second one of the plurality of circumferential grooves.

17. The deployable shelf assembly according to claim 15, wherein a frictional force provided by the at least one O-ring is configured to maintain the deployable shelf in a stowed position without requiring a separate latch.

18. The deployable shelf assembly according to claim 15, wherein the dowel pin and the bracket are integrally formed.

19. The deployable shelf assembly according to claim 15, wherein the plurality of circumferential grooves are spaced apart and parallel.

* * * * *